Oct. 18, 1932.  O. W. HAHN  1,883,732
COMPENSATING VEHICLE BRAKE
Filed May 28, 1928   2 Sheets-Sheet 1
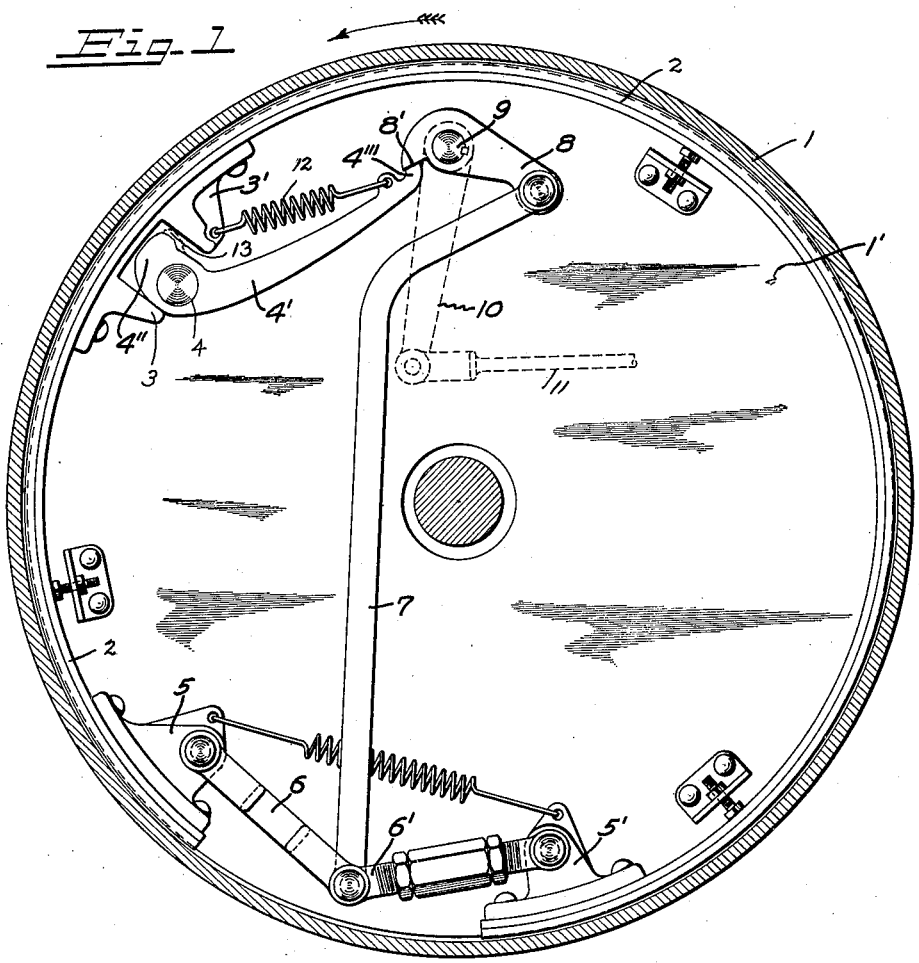
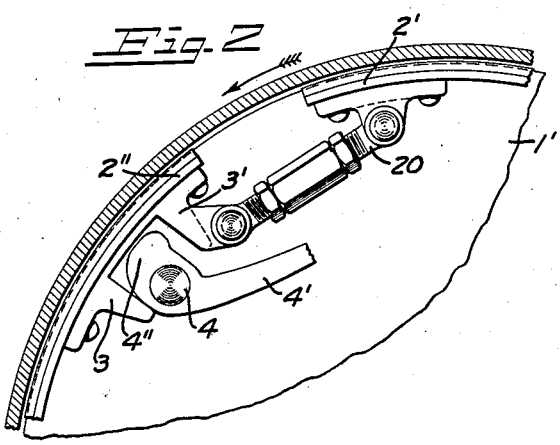
INVENTOR
OTTO W. HAHN
BY
ATTORNEYS.

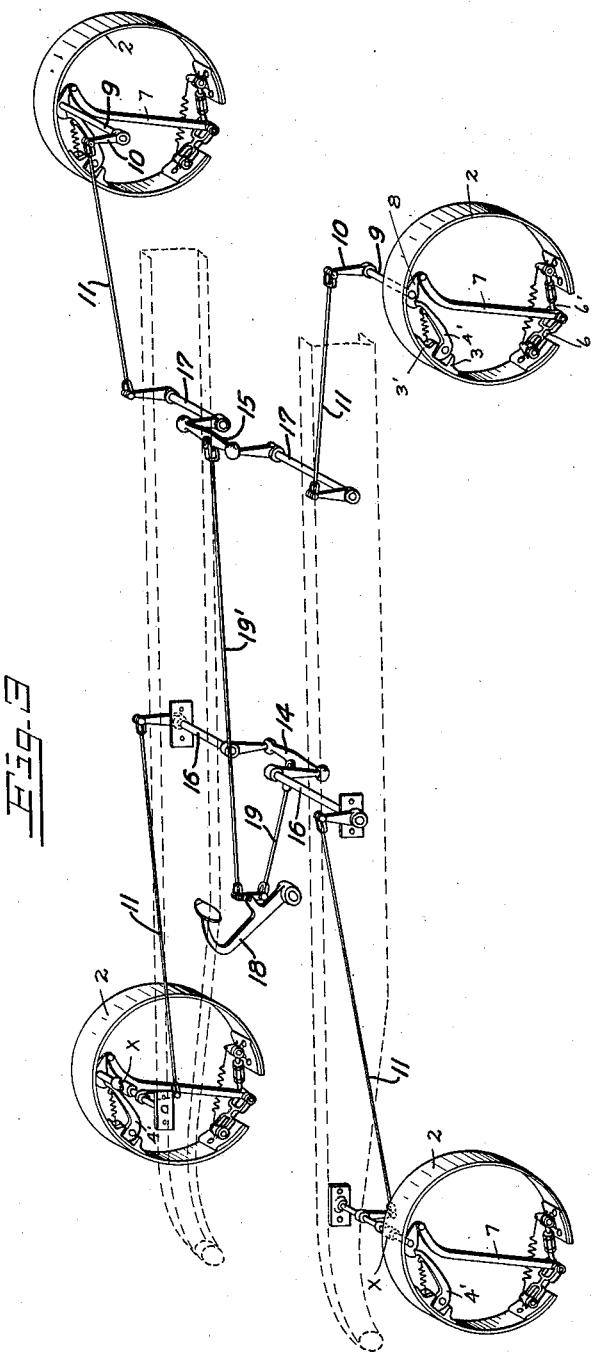

Patented Oct. 18, 1932

1,883,732

UNITED STATES PATENT OFFICE

OTTO W. HAHN, OF SAN FRANCISCO, CALIFORNIA

COMPENSATING VEHICLE BRAKE

Application filed May 28, 1928. Serial No. 281,259.

This invention relates to brakes for vehicle wheels, particularly automobile brakes and has for its objects improvements in construction whereby an automatic equalization of the frictional resistance in the brakes of a pair or more of wheels is obtained, also a construction which prevents locking of one brake only of a set, also a braking system which will function to prevent too rapid an application of the brakes of a vehicle traveling at high speed, also a system which will compensate for unequal adjustment of the brakes.

In the drawings Fig. 1 is a view in elevation showing an internal expanding type of brake mechanism constructed in accordance with my invention.

Fig. 2 is a portion of a view similar to that of Fig. 1 but showing the invention applied to a two shoe brake.

Fig. 3 is a perspective sketch of a four-wheel brake installation incorporating my invention.

Before describing my invention in detail the reasons for the invention had best be stated so as to make the invention easier to understand.

In the ordinary automobile brake system, the braking element on each wheel may either be a contracting band arranged to be contracted against the brake drum carried by the wheel, or it may be of the internal expanding type adapted to expand against the inner periphery of the brake drum, and of course in most cars the rear wheels carry both types of element.

With any style of braking element the operative force applied to a pedal by the foot of the vehicle operator is transmitted by means of a system of pull rods, links, bell cranks, shafts, etc. leading to the different wheels of the vehicle, and in order that an equal or balanced force be transmitted to each pair of opposite wheels recourse is had to a brake equalizer lever or levers much on the principle of the whiffle trees used to transmit the pull of a pair of horses to a vehicle.

However, this should be carefully noted, for though the equalizers insure a balanced pull to the brake band levers, or twist to the brake shoe actuating shafts at the end of the system remote from the application of force, this does not necessarily mean that an equal resistance to rotation of the wheels will result. This is a very important fact which appears to have been overlooked in all wheel braking systems in use today whether foot or power operated.

The reasons for unequal braking effect with equal application of contractile or expanding effort on the brake bands or shoes is due to several features, such for instance as a different condition of the braking material on one wheel, either through the ingress of oil, water, dust or sand, for it is plain that in such a case though both brake bands of a pair of wheels were pulled at their ends with say 200 pounds, one might grip savagely through the presence of grit and the other might slip freely through the presence of oil.

What is wanted in each brake of a pair of wheels is a balanced resistance to torque so that each wheel will be resisted in equal degree from rotation—a totally different matter than an equalized pull or twist on the actuating mechanism.

Another problem to be met in braking an automobile is found when one wheel is running on slippery mud and the other on firm tractive ground, for in this case equal forces applied to the two brakes will at once lock the wheel on the slippery side since it has little tractive resistance, and thereby cause the vehicle to skid, and perhaps leave the road, the amount of skidding depending on the particular conditions involved and the speed at which the vehicle is traveling.

It is through this danger of skidding that people learned by experience the value of going down hill in wet weather with the car in gear so that the resistance of the motor would be differentiated to the rear wheels through the compensating gears of the rear axle.

In my invention the object is not to merely provide a balanced application of force to the different brakes, but to apply a balanced resistance to rotation of the brake drums and consequently the wheels to which they are attached. Therefore to accomplish this result I first apply power to the brake actuating devices of whatever kind in the usual way. This power may be foot power, or any other power and it is equalized by any of the known means, such for instance by the brake equalizer levers if foot power is used, and I provide brake elements (shoes or bands) which are free to be bodily rotated slightly by and when gripping the brake drums, and reactance mechanism operated by the bodily rotation of the brake elements connected back to the brake actuating mechanism so that a portion of the power applied to tighten a brake reacts to loosen this brake and working through the equalizer will tend to tighten up the brake on the opposite wheel or vice versa until the torque of both brakes is equal.

The above will be clear from a consideration of Fig. 1 in which 1 is a brake drum as attached to any automobile wheel and which rotates in direction of the arrow when the car is going forwardly.

Within the drum 1 is a brake band or shoe 2 of the internal expanding type anchored by means of jaws 3—3' to an anchor pin 4 carried by the fixed housing shell or side plate 1' of the drum. The free ends of the expanding shoe 2 are provided with lugs 5—5' and pivotally connected by toggles 6, 6' to a link 7 pivoted at its opposite end to a crank 8 secured to the inner end of a short shaft 9 rotatably carried by the drum housing and to the outer end of which shaft is secured a crank 10 in turn pivotally connected to one of the pull rods 11 of the brake operating system.

The members thus far described illustrate a common form of brake mechanism as found with some variations on most automobiles, and the parts from 5 to 10 are herein termed the brake actuating mechanism as distinguished from the system of equalizers and rods extending to the foot lever.

In ordinary brake mechanisms of the character described the anchor lug or pin is a fixed member and merely an anchor to stop bodily rotation of the brake elements when gripping the drum so that the latter will be brought to a state of rest, and the principal difference in my construction is that the anchor pin 4 is not merely a fixed anchor to stop bodily rotation of the brake elements, but is especially designed to permit a certain amount of bodily rotation of the brake elements and to transmit the resultant power developed back to the brake actuating mechanism to modify its action.

This is accomplished by making the anchor pin 4 rotatable in the drum housing and extending from the pin a lever arm 4', the short end 4" of this arm being positioned between the brake band jaws 3, 3', and the long end 4''' bearing against a shoulder or short lever 8' formed on actuating crank 8 and resiliently held thereagainst by action of a tension spring 12.

With reference to Fig. 1, if the brake drum is revolving backwards (car backing up) the brake anchor jaw 3 will remain in contact with the substantially circular portion of lever 4' due to the tendency of the brake shoe to revolve with the drums, and as the brake is applied through motion given the crank 8 any movement of lever 4' does not affect the brake shoe as it would simply revolve its circular portion against the jaw 3.

However, if the revolution of the wheel and drum is forward, in direction of the arrow and the brake is applied, a totally different action takes place as follows:

As soon as friction between the shoe and drum is generated the entire brake shoe or band revolves with the drum closing the gap 13 between the short end 4" of the anchor lever and the anchor jaw 3' against the resistance of spring 12, and as the application of braking power becomes more complete through further swinging of crank 8 the short end 4" of the lever 4' is gradually brought to dotted position in opposition to the bodily rotation of the brake shoe and in effect carrying the entire rotative effort of the brake shoe on the short end of a lever (4") for transmission back through the long end 4''' to react against the short end 8' of actuating crank 8.

It should be noted that under these conditions the entire revoluble effort of the brake drum is transferred through the medium of brake shoe anchor jaw 3' through a reducing lever 4' and balanced against the short end of lever 8, and apparently the arrangement would serve no useful purpose.

However if the brakes of opposite wheels are constructed in accordance with the above, and their actuating cranks 10 connected together for simultaneous operation through the agency of a common equalizing brake operating system as shown in Fig. 3 wherein 14 and 15 are the equalizing levers pivotally connected to equalizing shafts 16, 17 in the well known manner and all operated by means of a foot lever 18, a totally different effect takes place upon braking the wheels, for in this case the pull of rod 19 or 19' is distributed equally between the cranks 10 of opposite wheels and consequently both brakes are expanded with equal force against their drums.

However, as suggested before, equal force applied to both brakes would be no indication of equal resistance to turning of the brake drums for the reasons given. In ordinary brakes, inequalities of braking are also caused by unequal conditions in the lever and brake shoe, their resultive combination of links and angles, and it is a fact that absolutely equal conditions of these levers may sometimes give unequal individual brake results between a pair.

But in this invention, however, the rotating effort of the brake shoe itself; generated by friction against it through revolution of the brake drum; reacts on the revolvable pin or shaft 4, (or rather the lever 4' if same be free on pin 4) which, can only revolve when the brake drums move in a direction corresponding to a forward movement of a vehicle, and when this forward movement occurs, the rotating power resulting from the coefficient of friction with the speed of the brake drum as a factor, is transmitted to the levers 4' of each of the brake drums of a pair of wheels. If, for any reason whatsoever, these forces are unequal, one or the other of the anchor pins may revolve on its axis together with its attached lever 4'. This lever will press against the jaw 8' of the crank 8, turning the crank 10 slightly in reverse direction and thereby putting a greater pull on rod 11, which however, can equalize itself through the medium of the brake pull equalizer to the opposite wheel and thus increase the pull on the opposite brake until it develops an equal reactance on the system and hence an equal torque.

If, on the other hand, both brakes should be holding equally, they will transfer jointly and equally their reactance to brake shoe rotation against the foot pull lever or the operator's foot. This, however, does not become very noticeable unless the speed of the vehicle is extremely great and in which case it simply acts as a counter-force preventing the too rapid application of brakes at dangerous speeds.

It will be noted from this description that one brake shoe cannot lock with the other free, since the harder it tends to lock the harder will be its effort to release itself due to increasing effort of the brake shoe or band to rotate. With the proper proportioning of the levers however, this will not prevent the hard (and equal) application of the brakes with sufficient force to absorb all of the useful frictional braking power up to the point of traction of the wheels with the good results so that if the pavement has equal tractional resistance, both wheels will hold equally, and will slide equally if the braking is carried to that point. If, however, the tractional resistance of the roadway be unequal, the action of the mechanism has a tendency to apply the brake on the wheel which is slipping on the roadway harder, thereby releasing somewhat the braking effort on the wheel which has tractional resistance. At first consideration, this may seem undesirable, but it is a fact that in skidding, the brake which is attached to the wheel which has tractional resistance, tends to make this wheel act as a pivot, sliding the other wheel around such pivotal point.

In Fig. 3 I have shown a typical four-wheel brake hookup made in accordance with my invention, the front wheel brake actuating mechanism including universal joints or their equivalent at X in line with the steering knuckle pivots, but this is illustrative only as many forms of brake power transmission to the front wheels are in use and my invention has to do with the brake actuating mechanism and not to any specific type of outside operating linkage for it is evident without illustration that the principle involved i. e. "interposing an increment of the rotative effort of the brake shoe in opposition to the brake operating member" whether the member be a mechanically turned crank or a hydrostatic cylinder would make no difference for the result would be substantially the same.

In Fig. 2 I show a modification of the brake mechanism employing two brake shoes instead of the one shown in Fig. 1, and a slightly different lever hook-up.

In this case the brake shoe pressure applying mechanism is not shown as it may be like that shown in Fig. 1 or any other design, and the drawing is therefore restricted to the torque reactance anchoring hook-up only. The figure shows two adjacent ends of the shoes 2' and 2" pivotally connected together by an adjustment link 20, and the anchor lever 4, 4', 4" operates between anchor jaws 3 and 3' all as explained for Fig. 1.

Having thus described my invention and its mode of operation, it will be seen to apply to any type of brakes, and to a pair or several pairs of wheels of a vehicle, and therefore I claim:

1. In a wheel brake, a brake drum and a fixed side plate, a braking element, means pivoted to the side plate for applying or forcing the element against said drum for arresting the same, means permitting bodily rotative movement of said element in direction of rotation of the drum upon application of the brake, and means for transferring a portion of the rotative energy thereby produced in the element back into the brake applying means, said means for transferring a portion of the rotative energy comprising a lever pivotally anchored to a fixed member, means on the element anchored against a short end of said lever against rotation in both direction whereby the lever must carry the torque developed by the element, and a long end to said lever fulcrumed against a portion of the means for applying the brake.

2. In a wheel brake, a brake drum carried by the wheel, a circular braking element for said drum, actuating means including a crank pivoted to a point fixed relative to the brake drum axis arranged and adapted to force said element into contact with the periphery of said drum, an anchor jaw carried by said element, an anchor pin, a long and short ended lever pivoted on said anchor pin, said anchor jaw engaging the short end of said lever and arranged for moving said lever upon rotative tendency of the element when gripping said drum, the long end of said lever reacting against said crank.

3. In a vehicle wheel brake, a drum, an internal braking element adapted for expansion outwardly in all directions against the rim of said drum, means supporting said element in free floating relation to the drum for such expansion while permitting bodily rotation with the drum upon application of the brake and means tending to resist rotation of the element with the drum for rotating the element oppositely to the drum when the brake is released, power transmitting means for expanding and applying the brake, a fixed anchor carried by the vehicle, a lever pivotally mounted on said anchor provided with a long and short end, means on said element arranged to engage the short end of the lever for moving the same about its pivot upon either direction of rotation of the element, and means operated by the long end of the lever reacting against the application of power from said power transmitting means upon the bodily rotation of said element.

4. In a braking system for a pair of opposite wheels of a vehicle, braking elements for each wheel, applicator linkage for said braking elements including levers pivoted to supports non-rotatably secured to said vehicle, and means operated by the braking elements for utilizing the torque developed in the braking elements and reacting same through said applicator linkage and levers to the end of balancing the torque developed in the brakes of both wheels.

5. In a braking system for the four wheels of an automobile, braking elements for each wheel, applicator linkage for operating the braking elements of all four wheels simultaneously including levers pivoted to supports non-rotatably secured to said vehicle, and means operated by the braking elements for utilizing the torque developed in the braking elements and reacting same through said levers and applicator linkage to the end of balancing the torque developed in the brakes of each pair of wheels.

6. In a vehicle wheel brake, a drum on the wheel, a braking element carried by the axle expansible within said drum, a lever pivoted to a fixed point relative to the axle and arranged to deliver power for expanding said element, an applicator system for the brakes of the vehicle including a pull device connected to said lever, means permitting limited bodily rotative movement of said braking element in direction of rotation of the drum upon application of the brake, and means transferring a portion of the rotative energy thereby produced in the element back into said applicator system through said lever for reactance against a similar brake in another wheel of the vehicle.

OTTO W. HAHN.